United States Patent
Nasilowski et al.

(10) Patent No.: US 12,332,123 B2
(45) Date of Patent: Jun. 17, 2025

(54) TEMPERATURE MONITORING DEVICE, TEMPERATURE MONITORING METHOD, AND TEMPERATURE MONITORING SYSTEM

(71) Applicant: INPHOTECH SP. Z O.O, Ołtarzew (PL)

(72) Inventors: Tomasz Nasilowski, Warsaw (PL); Marek Napierala, Warsaw (PL); Lukasz Szostkiewicz, Torun (PL); Alejandro Dominguez-Lopez, Granada (ES); Krzysztof Markiewicz, Warsaw (PL); Jakub Kaczorowski, Marki (PL); Mariusz Biela, Rakownia (PL); Piotr Plaszczykowski, Osowiec (PL)

(73) Assignee: INPHOTECH SP. Z O.O, Ołtarzew (PL)

( * ) Notice: Subject to any disclaimer, the term of this patent is extended or adjusted under 35 U.S.C. 154(b) by 1023 days.

(21) Appl. No.: 17/231,924

(22) Filed: Apr. 15, 2021

(65) Prior Publication Data
US 2021/0278289 A1    Sep. 9, 2021

Related U.S. Application Data

(63) Continuation of application No. PCT/IB2019/058859, filed on Oct. 17, 2019.

(30) Foreign Application Priority Data

Oct. 18, 2018    (PL) .......................................... 427454

(51) Int. Cl.
*G01K 11/32* (2021.01)
*G01K 1/024* (2021.01)
(Continued)

(52) U.S. Cl.
CPC .............. *G01K 11/32* (2013.01); *G01K 1/024* (2013.01); *G01K 3/005* (2013.01); *G07C 5/0833* (2013.01)

(58) Field of Classification Search
CPC ............................... G01K 11/32; G01K 1/024
See application file for complete search history.

(56) References Cited

U.S. PATENT DOCUMENTS 4,830,513 A * 5/1989 Grego .................... G01K 11/32
356/519
2016/0356709 A1* 12/2016 Kremp ............... G02B 6/02052
(Continued)

FOREIGN PATENT DOCUMENTS

CN    104048684 A *  9/2014
EP    0213872 A2 * 11/1987
(Continued)

OTHER PUBLICATIONS

Translation of CN104048684A (2014).*
Translation of CN104111086A (2014).*

*Primary Examiner* — Mirellys Jagan
(74) *Attorney, Agent, or Firm* — The Concept Law Group, PA; Scott D. Smiley; Scott M. Garrett

(57) ABSTRACT

A temperature monitoring device containing a control system adapted to generate substantially periodic control waveforms applied to the control input of the light source with tunable wavelength connected to an optical fiber interferometer, in which a measuring optical fiber is connected in one its arms, and the interferometer output is connected to a detector whose output is connected to a signal processing module adapted to identify temperature changes in the optical fiber length function, in accordance with the invention, characterized in that the light source coherence length is longer than 0.5 m, and the period of the periodic waveform is shorter than or equal to 20 s, the difference between (Continued)

the minimum and maximum wavelength is higher than 3 pm, and the optical fiber is adapted to its placement near exoenergetic devices in a vehicle, during its operation. The temperature monitoring method according to the invention is characterized in that the temperature is determined by cumulatively accounting for changes detected using the device according to the invention at measurement points on the measuring optical fiber of this device. The temperature monitoring system according to the invention is characterized in that the measuring optical fiber of the device according to the invention is placed near exoenergetic devices in a vehicle.

9 Claims, 3 Drawing Sheets

(51) Int. Cl.
  *G01K 3/00* (2006.01)
  *G07C 5/08* (2006.01)

(56) References Cited

U.S. PATENT DOCUMENTS

2017/0336269 A1* 11/2017 Wilson ............... G01K 11/3206
2020/0109971 A1*  4/2020 Lanticq ................. G01K 11/32

FOREIGN PATENT DOCUMENTS

| | | | | |
|---|---|---|---|---|
| KR | 20120013597 A | * | 2/2012 | |
| WO | WO-2017116383 A1 | * | 7/2017 | ........... E21B 47/102 |
| WO | WO-2018078359 A1 | * | 5/2018 | ............. G01K 11/32 |

* cited by examiner

| Measurement point | Component | Normal operating temperature [°C] | Threshold value of temperature [°C] |
|---|---|---|---|
| P1 | Fuel pump | 80 | 110 |
| P2 | Fuel manifold | 74 | 104 |
| P3 | Alternator | 85 | 115 |
| P4 | Starter | 85 | 115 |
| P5 | Electronic control system | 60 | 90 |
| P6 | Turbocharger | 140 | 170 |
| P7 | Oil pan | 88 | 118 |

| RETUNING TIME (s) | TUNING RANGE (pm) | MAXIMUM THEORETICAL TUNING RESOLUTION (cm) |
|---|---|---|
| 20 | 3 | 54.85 |
| 8 | 8 | 20.57 |
| 4 | 17 | 9.68 |
| 1 | 50 | 3.29 |

FIG. 4

TEMPERATURE MONITORING DEVICE, TEMPERATURE MONITORING METHOD, AND TEMPERATURE MONITORING SYSTEM

CROSS-REFERENCE TO RELATED APPLICATION

This application claims priority to PCT application PCT/IB2019/058859, filed Oct. 17, 2019, and through that application to Polish patent application no. PL427454, filed Oct. 18, 2018, the entireties of which are hereby incorporated by reference.

FIELD OF THE INVENTION

The present invention relates generally to temperature monitoring and, more particularly to a temperature monitoring device, a temperature monitoring method, and a temperature monitoring system. The invention is used particularly in early vehicle fire risk detection, particularly in the engine compartment or in electric power storage compartment, particularly for batteries.

BACKGROUND OF THE INVENTION

There are numerous solutions for distributed temperature measurement with optical fibers, known in the art. These solutions are based on, among other things, the physical phenomena of Rayleigh scattering, Raman scattering, and Brillouin scattering.

Rayleigh scattering is the scattering of light under the influence of heterogeneity of the environment in which light propagates. One disadvantage of techniques involving the utilization of this phenomenon is the lack of absolute information about temperature changes in the studied environment.

The Raman effect is used to measure temperature using the Stokes and anti-Stokes intensity difference analysis in the optical fiber length function. The light intensity analysis enables us to determine the absolute temperature, unfortunately with relatively small resolution—at the level of 1 m—in the optical fiber length function. Furthermore, the use of the Raman effect to monitor temperature requires using very sensitive detectors or a great amount of averaging because this effect is quite weak.

The use of the Brillouin effect to measure temperature involves analyzing the frequency of propagation of the acoustic wave generated in the optical fiber, excited by intense light.

In the publication no. WO2006027369 of the international patent application of 16 Mar. 2006, of the invention entitled "Calibrating an optical fmcw backscattering measurement system," an optical temperature monitoring system operating on the basis of the Rayleigh effect is disclosed, with a light source having wavelength tuned with a sawtooth waveform, in which temperature changes in the measuring optical fiber length function are determined on the basis of detection and analysis of the reflected wave interfering with the source wave.

In the publication no EP3246683 of the European patent application for the invention entitled "Optical health monitoring for aircraft overheat and fire detection," of 17 May 2017, there is disclosed a method for detecting overheating and fire risk by monitoring temperature using optical fiber involving temperature measurement, detecting whether the threshold value is exceeded, and generating an alarm in such case.

Therefore, a need exists to overcome the problems with the prior art as discussed above.

SUMMARY OF THE INVENTION

The invention provides a temperature monitoring device, method, and system that overcomes the hereinafore-mentioned disadvantages of the heretofore-known devices and methods of this general type and that provides a device adapted to temperature monitoring in vehicle engines, particularly of cars and buses, enabling the detection of vehicle component failures correlated with changes, and particularly with increases in temperature.

With the foregoing and other objects in view, there is provided, in accordance with the invention, a temperature monitoring device comprising a control system operable to generate a substantially periodic control waveform, a tunable wavelength light source with a control input coupled to an output of the control system, an optical fiber interferometer with an input coupled to an output of the tunable wavelength light source, an arm coupled to the optical fiber interferometer, the arm including a measuring optical fiber, a detector with an input coupled to an output of the optical fiber interferometer, and a signal processing module operable to identify temperature changes in a function along an optical fiber length and having an input coupled to an output of the detector. In addition, a light source coherence length is longer than 0.5 m, a period of the periodic waveform is shorter than or equal to 20 s, a difference between the minimum and maximum wavelength is higher than 3 pm, and the measuring optical fiber is adapted to be placed in a proximity of exoenergetic devices in a running vehicle.

In accordance with another feature, the measuring optical fiber is a single-mode optical fiber.

In accordance with a further feature of the present invention, the connection between the interferometer and the measuring optical fiber includes a single-mode excitation system.

In accordance with an additional feature of the present invention, at least one higher-order mode filter is interconnected between the light source and the detector.

In accordance with yet another feature, a polarizer or a polarization splitter is located between the light source and the detector.

In accordance with the present invention, the measuring optical fiber is a polarization-maintaining optical fiber.

In accordance with another feature of the present invention, the detector has an equivalent noise power of 60 pW*Hz$^{-1/2}$ or less.

In accordance with another feature of the present invention, the signal processing module is connected to the detector via an analogue-to-digital converter with a resolution of at least 6 bits and a sampling rate of at least 20 kHz.

In accordance with yet another feature, an embodiment of the present invention includes an ambient temperature sensor communicatively coupled to the control system.

In accordance with an additional embodiment of the present invention, the measuring optical fiber includes a component located at or near an end thereof, the component being capable of reducing a reflectance by at least 20 dB.

In accordance with the present invention, a method of temperature monitoring in a vehicle includes the steps of providing a temperature monitoring device, detecting, with the temperature monitoring device, a temperature exceeding a specified threshold value, generating an alarm signal in response to the detecting step, setting an initial temperature, tuning the wavelength light source during a sweep stage, iteratively determining temperature changes along the measuring optical fiber, and comparing the threshold value to a current temperature value of at least one measurement point within the length of the measuring optical fiber, which is cumulatively updated.

In accordance with yet a further feature of the method, the measuring optical fiber is disposed in a vehicle near at least one component selected from the group that includes a fuel pump, a fuel manifold, a turbocharger, an exhaust manifold, an alternator, starter, air compressor, an oil pump, an oil pan, a heater unit, an AC compressor, an electronic control system, an electric wire harness, a in battery, and a fuel cell, and the at least one measurement point is located near said at least one component in the group.

In accordance with one more feature of the present invention, the initial temperature is determined by an automatic readout of the ambient temperature sensor.

In accordance with an additional feature, the present invention includes entering the initial temperature into the control system via an interface.

In accordance with another feature of the present invention, the generated alarm signal is chosen depending on which point of the measuring optical fiber is the point where the temperature exceeds the threshold temperature.

In accordance with a further feature of the present invention, the measuring optical fiber is near at least one component selected from a group including a fuel pump, a fuel manifold, a turbocharger, an exhaust manifold, an alternator, a starter, an air compressor, an oil pump, an oil pan, a heater unit, an AC compressor, an electronic control system, an electric wire harness, a battery, and a fuel cell.

Although the invention is illustrated and described herein as embodied in a temperature monitoring device, method, and system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 4 depicts a table listing maximum theoretical spatial resolutions possible to achieve for selected preferable value pairs of source tuning time and tuning range.

DETAILED DESCRIPTION

Figure 1A:
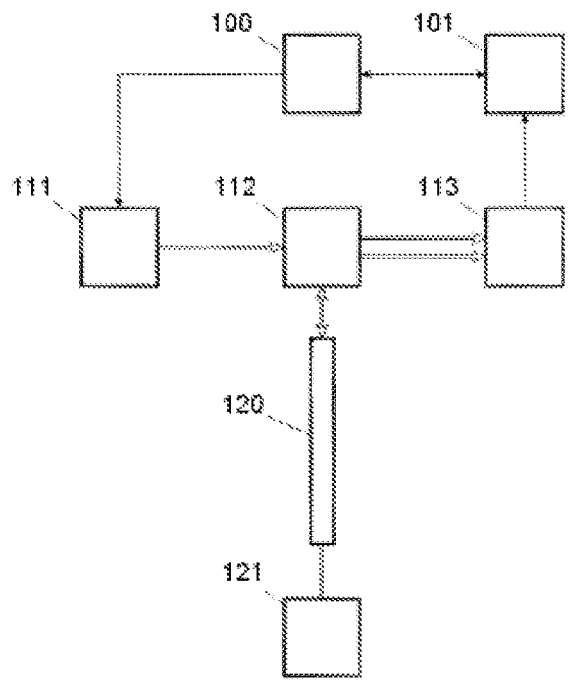
FIG. 1a depicts a block diagram of a device according to an embodiment of the invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The temperature monitoring device according to the invention contains a control system adapted to generate a substantially periodic control waveform applied to the control input of the light source with tunable wavelength connected to an optical fiber interferometer, in which a measuring optical fiber is connected in one of its arms. The interferometer output is connected to a detector having an output connected to the signal processing module adapted to identify temperature changes in the optical fiber length function. The light source coherence length is longer than 0.5 m, preferably 2 m, preferably over 20 m. The period of the substantially periodic control waveform is shorter than 20 s, preferably shorter than 10 s, or even shorter than 4 s. The use of a periodic waveform with such periods and their respective source wavelength tuning, respectively $\geq 3$ pm, $\geq 8$ pm, and $\geq 17$ pm, permits obtaining a spatial measurement resolution of, respectively, less than 50 cm, 20 cm, and 10 cm. The optical fiber is adapted to its placement near exoenergetic devices in a vehicle during its operation, which means, among other things, that its casing must endure temperatures of at least 70° C. without damage, and this casing should be selected so as to protect it against destruction or degradation up to, at least, the normal operating temperature of the component located next to the optical fiber.

Preferably, the measuring optical fiber is a single-mode optical fiber. Such a solution permits a simple implementation of algorithms while simultaneously not requiring additional systems that enforce single-mode operation.

Alternatively, the connection between the interferometer and the measuring optical fiber runs through a single-mode excitation system.

Also, alternatively, there is at least one mode filter or a device that ensures single-mode operation between the light source and the detector.

There is at least one polarizer or polarization splitter between the light source and the detector that ensures operation with a single light polarization and avoids using polarization splitting systems and separate detection of its orthogonal states.

Preferably, the measuring optical fiber is a polarization-maintaining optical fiber which ensures operation with a single light polarization without additional systems.

Preferably, the detector is characterized by an equivalent noise power equal to 60 pW*Hz$^{-1/2}$ or less, which simplifies the implementation of control algorithms and reduces the risk of errors. Preferably, the equivalent noise power is less than 20 pW*Hz$^{-1/2}$.

Preferably, the signal processing system is connected to the detector through an analogue-to-digital converter with a resolution of at least 6 bits and a sample rate of 20 kHz or more, which simplifies the implementation of control algorithms and the provision of sufficient resolution.

Preferably, the device contains an ambient temperature sensor connected to the control system.

Preferably, the measuring optical fiber contains at its end a component that reduces reflectance, particularly with an attenuating component.

The temperature monitoring method for a vehicle using a temperature sensor, involving the detection of temperatures exceeding a specified threshold value and generation of an alarm signal should this value be exceeded, in accordance with the invention, is characterized by the fact that the temperature that exceeds a specified value is detected using a device according to the invention. The measuring optical fiber is placed near exoenergetic components in a vehicle, an initial temperature is set, then, in subsequent light source tuning periods, it is used to iteratively monitor temperature changes along the measuring optical fiber, cumulatively updating current values for at least one measurement point within the length of the measuring optical fiber, which is then compared to the threshold value.

Preferably, the measuring optical fiber is placed in a vehicle near at least one component from the group that includes a fuel pump, fuel manifold, turbocharger, exhaust manifold, alternator, starter, air compressor, oil pump, oil pan, heater unit, AC compressor, electronic control system, electric wire harness, battery, and fuel cell, and at least one measurement point is located near at least one of these components. In particular, monitoring these components enables us to detect an increase in temperature correlated with the risk of fire or a failure that requires intervention.

Equipping the measuring optical fiber with a scale that indicates the distance from the beginning of the measuring optical fiber or from at least one measurement point permits an easier placement of the measuring optical fiber in the vehicle and assignment of measurement points to car components. This scale can constitute an additional component bundled with the optical fiber or a marking on its external surface.

Preferably, the initial temperature is determined by an automatic readout of the ambient temperature sensor.

Preferably, the initial temperature is entered into the control system via its interface.

Preferably, the generated alarm signal is chosen depending on which point of the measuring optical fiber is the point where the temperature exceeds the threshold value.

A system for monitoring a temperature of components of a vehicle containing a fiber optic device for measuring temperature placed near at least one component of the vehicle, according to the invention, is distinguished by the fact that the fiber optic device for measuring temperature is a device according to the invention.

Preferably, the system contains a digital system adapted to the automatic implementation of the method according to the invention. This system can be integrated with the control system of the device according to the invention.

In accordance with the invention, the computer program product adapted to temperature monitoring contains a set of instructions for the control system of the device according to the invention, executing with it the implementation of the method according to the invention.

Figure 1B:
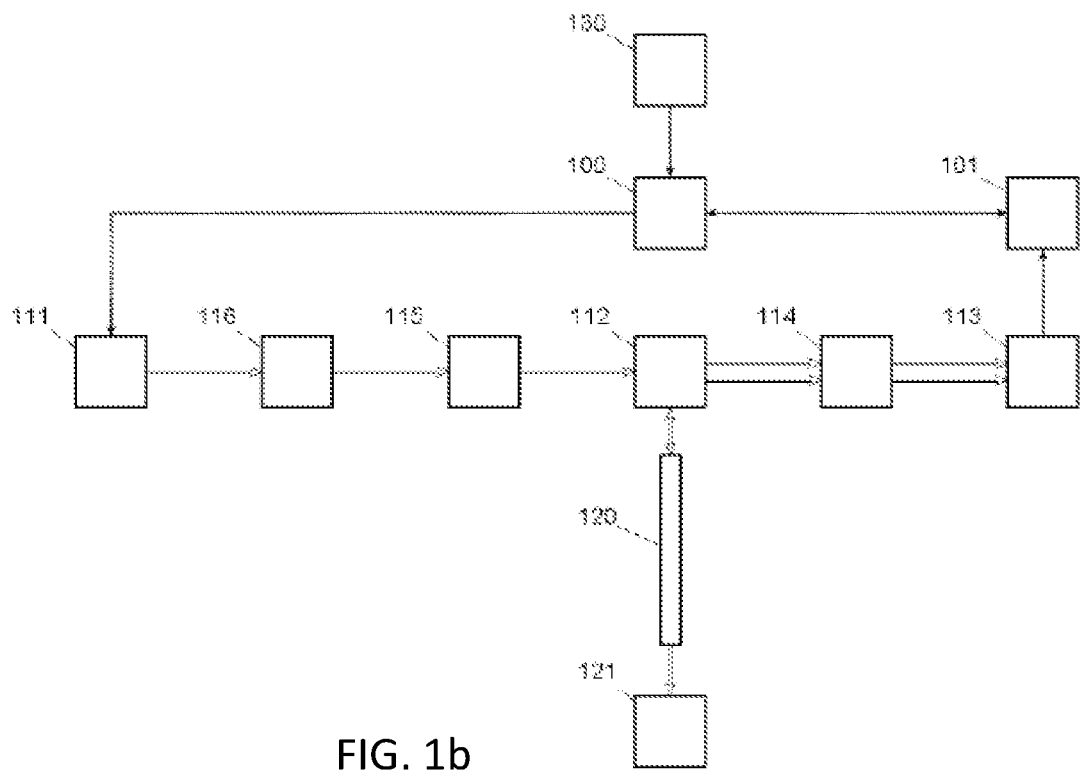
FIG. 1b depicts a block diagram of a device according to an alternative embodiment of the invention.
Figures 2, 3:
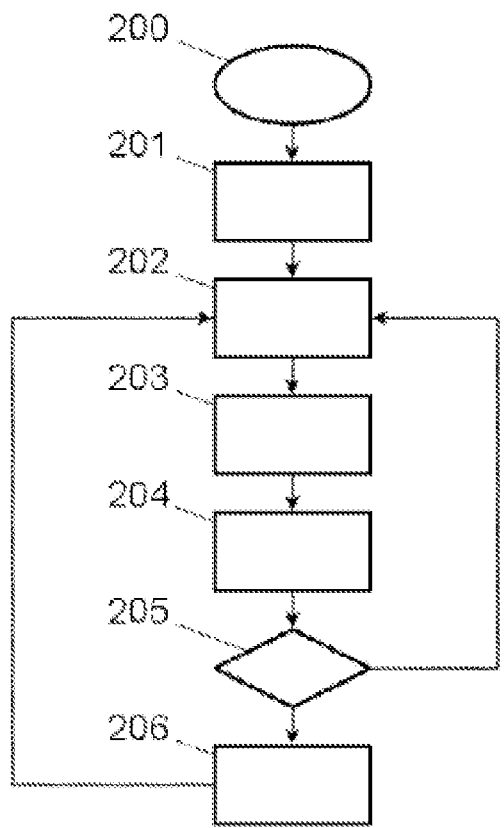
FIG. 2 depicts a flowchart of the method according to an embodiment of the invention.
FIG. 3 depicts a table with operating temperatures and threshold values of temperature of components in an embodiment of the system according to the invention.

The object of the invention is presented as embodiments in the drawing where FIG. 1a depicts a block diagram of a device according to an embodiment of the invention, FIG. 1b depicts a block diagram of a device according to an alternative embodiment of the invention, FIG. 2 depicts a flowchart of the method according to an embodiment of the invention, FIG. 3 depicts a table with operating temperatures and threshold values of temperature of components in an embodiment of the system according to the invention, while FIG. 4 depicts a table listing maximum theoretical spatial resolutions possible to achieve for selected preferable value pairs of source tuning time and tuning range.

The device, according to the embodiment of the invention, having a block diagram as depicted in FIG. 1a, is equipped with a tunable light source 111 controlled by the control system 100. The wavelength of light generated by the light source 111 is subject to tuning. Due to the simplicity of implementation of the temperature change measurement method, the best effects have been obtained with linear tuning, sawtooth tuning, or triangular tuning. Nonetheless, solutions with other periodic waveforms are possible. The source is connected to the interferometer 112 where it is being split. Light propagation is marked in FIG. 1 with a double line with arrows, showing a simplified direction of propagation.

The part of the light that constitutes the reference beam is directed to the detector 113 directly or through the reference arm (not shown in the figures), while the other part is directed to the measuring optical fiber 120 and constitutes the measurement beam. The measurement beam aimed at the measuring optical fiber is subject to Rayleigh scattering throughout its length. The result of this scattering is that the light is returned to the interferometer 112, which directs it to the detector 113. In the detector 113, an interference of the reference beam is observed, with light from the measurement beam scattered at various points of the measuring optical fiber. For some uses, it is reasonable to use two or more detectors and add their output signals. It is particularly useful approach if applied optical fiber does not maintain polarization.

Temperature change at points of light scattering results in changes in the signal detected by the detector 113. Said signal from the detector 113 is passed to the processing module 101 where a temperature change ΔT is determined for the measurement point based on changes in said signal.

The signal processing module 101 is connected to the control system 100. The control system 100 is connected to the tunable light source 111. Therefore, it is possible to synchronize signal processing with source tuning and to mark the location of measurement points along the length of the measuring optical fiber 120. Signal connections are marked in FIG. 1 by a single line.

Each point in the measuring optical fiber 120 can be treated as a source of light directed backwards. The beat frequency of a signal coming from such source with the reference signal is proportional to the distance along the optical fiber. It is a base to determine the location of a given measurement point in relation to the beginning of the optical fiber. The temperature measurement consists in analyzing the reverse Fourier transform at a specified section of the optical fiber. The phase of the observed beat changes under the influence of temperature, which unequivocally signifies a temperature change. Thus, the concept of a measurement point means a section of an optical fiber with a length equal to the spatial resolution, where a temperature change is read as an average temperature change over the length of the analyzed section. The spatial resolution also impacts the ability to differentiate between components. If necessary, it is possible to artificially extend optical fiber sections between measurement points, i.e., to place longer sections than necessary, as well as to place them multiple times near the same component.

The operation of the system is improved by the use of a device reducing the reflectance from the component 121, in particular of an attenuating component reducing the signal strength returning at the end of the measuring optical fiber. Such a component prevents the reflection of a strong signal from the end of an optical fiber and translates to an improved signal-to-noise ratio. It is advantageous to provide reflection attenuation of at least 6 dB. This function can be implemented, for example, by an angled physical connector (APC), or by ending the optical fiber with an angled cut covered by a substance whose index of refraction is similar to the index of refraction of glass, or by using an attenuator or optical isolator. A significant improvement in the measurement accuracy has been obtained by using 20 dB or stronger reflection attenuation systems. Devices that provide 60 dB of attenuation have significantly simplified the implementation of the method according to the invention.

The light source coherence length 111 should be at least twice as long as the measuring optical fiber 120. The coherence lengths applicable for monitoring vehicle engine compartments or battery compartments are typically in the range from 1 m to 1 km. This means that the light source 111 should have a bandwidth of at most 70 MHz, preferably less than 1 MHz. The best effects have been obtained for sources with a bandwidth of less than 100 kHz. Above bands correspond to coherence length that meets coherence length condition laid down in claims for central wavelength 1550 nm.

In this embodiment, the tunable light source 111 has a power of 0 dBm, but good effects have been obtained with sources whose power ranged between-5 dBm and 24 dBm.

The method according to the invention is easy to implement if the source is linearly tuned from a well-known initial wavelength, preferably with a precision of at least 5 pm, to a known wavelength. The tuning range should exceed 50 pm. The accuracy of the initial setting of the tuning point impacts the measurement uncertainty. An error of 1 pm translates to approximately 0.8 degrees kelvin of erroneous reading. In this embodiment, the light source 111 is adapted to wavelength tuning in a continuous manner, with a range of at least 1 nm.

In applications that require only several measurement points or which involve monitoring larger devices, light sources with a significantly narrower tuning range, even up to 3 pm, can be occasionally used. Maximum theoretical spatial resolution values for typical pairs of tuning time and tuning range are listed in the table presented in FIG. 4. It needs to be pointed out here that values which can be actually achieved in realistic operating conditions occasionally very significantly diverge—even by more than an order of magnitude—from theoretical ones. This justifies a redundant system design.

The measuring optical fiber 120 should be adapted to address one mode group. It should preferable be a single-mode optical fiber with an operating wavelength, preferably with a high numerical aperture, i.e., equal to or greater than 0.12. Such an aperture ensures an adequate level of reverse signal and an allowable level of bending losses. Good effects have been obtained for single-mode optical fibers that meet the requirements of the ITU-T G.652 recommendation.

The optical fiber casing should be adapted to long-term work at a temperature of 85° C. It could be made of, for example, polyamides, aluminium, copper, Ormocer, or gold. In certain applications, it is necessary to limit the casing to the most durable coating providing resistance to temperatures of at least 200° C. For example, a copper-based casing provides resistance to temperatures up to 400° C. while gold-based casing provides resistance to temperatures up to 600° C.

In this embodiment, the detector 113 has an equivalent noise power of 8 pW*Hz$^{-1/2}$ and a 3 dB band from 0 to 80 kHz. The signal processing system 101 is connected to the detector 113 via an analogue-to-digital converter with a resolution of at least 8 bits and a sample rate of at least 0.5 MHz. Conducted experiments demonstrate that these (or better) parameters of the detector and converter permit adequately fast and adequately accurate signal measurements in order to obtain temperature information based on its changes using relatively simple and easily implemented algorithms. The use of a detector with lower equivalent noise power and/or wider bandwidth and a converter with a higher resolution and/or faster sample rate will improve the parameters of the device and system according to the invention.

An alternative embodiment is shown in FIG. 1b. Alternatively or together with the use of a single-mode optical fiber, one can introduce a higher-order mode filter 114 to the measurement path between the light source 111. It will operate the best if placed near the detector 113.

Another allowable alternative solution is a selective increase in loses of higher-order modes before a multi-mode optical fiber or by using a special excitation of a multi-mode optical fiber in order to effectively propagate 1 mode.

Furthermore, one can use a single-mode excitation system 115 between the interferometer and the measuring optical fiber.

Equipping the device with a polarizer 116 between the light source 111 and the detector 113 constitutes an alternative for using a polarized light source. In such a system, if one uses a polarization splitter and detector that detects orthogonal polarizations, enabling one to obtain a signal by summing the signal from two orthogonal polarizations, it is possible to obtain operation in a system that does not maintain polarization automatically.

In an alternative embodiment, it is possible to use polarization-maintaining optical fibers, which permits the elimination of polarization components from the system (polarizer or polarization splitter). Polarization-maintaining optical fibers which can be used include e.g., PANDA and bow-tie fibers, or elliptical-core fibers known from the state of the art, e.g., from the publication titled "Polarization-maintaining fibers and their applications," Noda J., et al., 1986, Journal of Lightwave Technology, vol. 4, issue 8.

The use of an additional ambient temperature sensor 130 connected to the control system 100 facilitates the determination of initial temperature To against which the current temperature is updated by determining subsequent changes in ΔT. Alternatively or complementarily, one can use a system that allows inputting temperature values by the user or a signal receiver from an external device-independent temperature sensor.

The temperature monitoring method according to the invention can be used to detect the risk of fire by monitoring temperature in the engine compartment or battery compartment, and by specifying a single threshold value for all measurement points. In such case, the threshold value is chosen from the range of 130° C. to 220° C.; in this embodiment, it is 175° C. Such range and value selection requires using a more resistant casing for the measuring optical fiber; in this embodiment, copper-based casing is used. If this value is exceeded, an alarm signal is generated. The use of the device according to the invention permits indicating—along with the alarm signal—the measurement point where the temperature threshold value is recorded. The temperature is monitored using the device according to the invention, whose measuring optical fiber 120 is placed in the engine compartment or in the battery compartment, and laid near exoenergetic components; then, changes at measurement points assigned to these components and located on the measuring optical fiber 120 are cumulatively updated. This method of analysis requires setting an initial temperature. The initial temperature inside the engine compartment is input in the device according to the invention, or read from the ambient temperature sensor 130, alternatively a signal representing the temperature is received. Setting the initial temperature $T_0(d)$ for at least one point throughout the optical fiber is included in the initialization stage 200 in the flowchart shown in FIG. 2. Initial temperature is set at stage 201. It can be entered manually, read from a sensor, averaged from a sensor grid, or obtained from another independent source such as a weather station. Then, during the sweep stage 202, the light source 111 is periodically tuned, changing its wavelength with a sawtooth waveform. This can also be a symmetric waveform with linear changes of wavelength, or another waveform known from the state of the art. In subsequent tuning periods indexed by the variable n, temperature changes ΔT along the measuring optical fiber 120 ΔT(d) are iteratively determined 203, cumulatively updating 204 current values for at least one measuring point within its length, substituting T (d, t=n)=T (d, t=n−1)+ΔT, which is compared 205 to the threshold temperature value −175° C. in this embodiment. If the temperature T (d, t=n) exceeds the threshold value, an alarm is generated 206. Of additional value is the ability to state the measurement point where the value exceeded the threshold. Then subsequent (n+1) sweeps are performed. This method can be performed automatically under the control of the control system 100. It is then equipped with memory containing the program executing the method according to the invention using the device according to the invention. The device is then adapted to autonomous identification of temperature changes in the optical fiber length function and in the time function, as well as—preferably—alarm generation.

Temperature changes at the measurement point P, located at the distance d from the beginning of the measuring optical fiber 120, are determined using the state-of-the-art OFDR (Optical Frequency Domain Reflectometry) method using cross-correlation 2 of signals—temperature change signal—in the current iteration and in the reference (previous) iteration. These signals can be determined using a reverse complex Fourier transform of the signal coming from the studied section of the optical fiber. Only the section of frequencies of beats present at the detector, corresponding to the spatial resolution, is taken into consideration. Offsetting the cross-correlation of two measurements corresponds to the offset of the wavelength that reproduces the reference signal. Various techniques to this effect are presented in Jia Song's master thesis titled "Optical Frequency Domain Reflectometry: sensing range extension and enhanced temperature sensitivity," Ottawa-Carleton Institute for Physics University of Ottawa, Canada, 2014. However, a specialist in this field can routinely propose other applicable methods of determining temperature using a measuring optical fiber excited by a light source with a periodically tuned wavelength.

It is recommended to place the measuring optical fiber 120 in the engine compartment of a vehicle so as to make it run next to components that are prone to overheating in certain situations and which can cause fires, such as—for example: fuel pump, fuel manifold, alternator, starter, electronic parts of the engine, turbocharger, oil pan. Measurement points on the measuring optical fiber 120 are selected so as to place them directly next to these components. Normal operating temperatures of the aforementioned components are listed in the table shown in FIG. 3. Since these temperatures vary significantly, one can improve the fire detection specificity of the system according to the invention, using the method according to the invention, and the device according to the invention, by using different threshold values for different measurement points P1, P2, P3, P4, P5, P6, P7 of the measuring optical fiber 120, located at various distances from its beginning. Due to the significant spread of normal operating values, using different threshold temperature values for different measurement points is justified. Values used in this embodiment are also listed in the table shown in FIG. 3. The criterion for exceeding normal operating temperature by 30° C. or more is used. Other more complex criteria can be proposed as well, as per the requirements concerning specificity and sensitivity of the system in relation to the detection of fire risks. In particular, in order to improve specificity, it can be justified to increase the threshold value along the increases in ambient temperature. The choice of optical fiber casing depends on which vehicle components will be monitored. For example, in order to monitor the fuel manifold, one typically only needs a measuring optical fiber that is resistant to temperatures above 70° C.; monitoring a turbocharger requires resistances to temperatures of at least 140° C., or higher in certain models.

The group of components that includes components whose temperature will be measured is selected individually per vehicle. In addition to the ones mentioned before, it can also include the exhaust manifold, air compressor, oil pump, heater unit, AC compressor, electric wire harness, and in case of electric and hybrid cars: the battery, fuel cell, and converter. It is also justified to analyze exoenergetic devices and places prone to fire risk in the passenger area.

Preferably, the measuring optical fiber is equipped with a scale indicating the distance from the beginning of the measuring optical fiber or at least one measurement point. Such a solution facilitates the placement of the measuring optical fiber in a vehicle and assignment of measurement points to vehicle components.

The use of the system according to the invention enables one to detect the risk of fire as well as other detrimental phenomena correlated with an increase of temperature. In such situations, use threshold values that are relevant to a given phenomenon. For example, an exhaust system leak, e.g., in the area of the exhaust manifold or turbocharger, is connected with exhausting hot fumes, which constitutes a failure that requires intervention by itself. In some cases, hot fumes can also lead to the ignition of nearby components. Air system blockage can increase the pressure in the air compressor and thus increase temperature, which can also lead to ignition. A pulley blockage can lead to V-belts rubbing the pulley, which can lead to the ignition of these belts.

Depending on the way in which the measuring optical fiber is laid, a single component can be assigned to one or more measurement points. By laying the measuring optical fiber multiple times near a given component, e.g., by coiling, the number of measurement points can be multiplied, and additional criteria for the distribution of temperature at these points can be used.

The device, method, and system can be also used to detect failures correlated to the decreased temperature of devices, compared to the normal operating temperature. In such case, the threshold temperature is determined near the lower range of normal operating temperatures, and situations in which the device's temperature is lower than the threshold temperature are detected. Hybrid solutions are also possible, wherein two threshold temperatures are set, and both operating temperatures higher than the first threshold temperature and operating temperatures lower than the second threshold temperature are detected, marking both situations with appropriate alarms.

Having read this description, a specialist can routinely propose numerous alternative solutions concerning the placement of the measuring optical fiber, the distribution of measurement points, the values of threshold temperatures, or setting complex conditions for generating alarms related to the distribution of temperatures at measurement points and their relationship with threshold temperatures.

Having read the requirements and parameters indicated in this description, a specialist can also routinely propose numerous structural solutions for subcomponents of the device according to the invention, particularly various types of optical fiber and casing, as well as adequate detectors, light sources, or control systems. The control system can be an analogue system, a fully digital system, or a digital system with analogue peripheral devices for generating the control waveform. In particular, it is possible to use signal processors and FPGA circuits to this effect.

The method according to the invention can be executed by an operator or in an automated manner.

These and other invention execution variants are protected as defined in the attached patent claims.

The invention is also applicable for temperature control in battery cooling systems and measurements of temperature in the passengers space or energy resource management systems.

The claims appended hereto are meant to cover all modifications and changes within the scope and spirit of the present invention.

What is claimed is:

1. A temperature monitoring device comprising:
a control system operable to generate a substantially periodic control waveform;
an ambient temperature sensor communicatively coupled to the control system operable to detect an ambient temperature;
a tunable wavelength light source with a control input coupled to an output of the control system;
an optical fiber interferometer with an input coupled to an output of the tunable wavelength light source;
an arm coupled to the optical fiber interferometer, the arm including a measuring optical fiber;
a detector with an input coupled to an output of the optical fiber interferometer;
an analogue to digital converter operably coupled to the detector; and
a signal processing module operably coupled to the detector via the analogue to digital converter, and operable to identify temperature changes along an optical fiber length of the measuring optical fiber and having an input coupled to an output of the detector, wherein the signal processing module is operable to determine a temperature based on the temperature changes and the ambient temperature and, wherein:
  a light source coherence length is longer than 0.5 m;
  a period of the periodic control waveform is shorter than or equal to 20 s;
  a wavelength tuning range of the tunable wavelength light source is higher than 3 µm; and
  the measuring optical fiber is adapted to be placed in a proximity of at least one exoenergetic device in a running vehicle and is adapted to provide Rayleigh scattered signals to the interferometer.

2. The device according to claim 1, wherein the measuring optical fiber is a single-mode optical fiber.

3. The device according to claim 1, wherein a connection between the interferometer and the measuring optical fiber includes a single-mode excitation system.

4. The device according to claim 1, wherein at least one higher-order mode filter is interconnected between the light source and the detector.

5. The device according to claim 1 wherein, at least one of a polarizer and a polarization splitter is located between the light source and the detector.

6. The device according to claim 1, wherein the measuring optical fiber is a polarization-maintaining optical fiber.

7. The device according to claim 1, wherein the detector has an equivalent noise power of 60 pW*Hz$^{-1/2}$ or less.

8. The device according to claim 1, wherein the analogue-to-digital converter has a resolution of at least 6 bits and a sampling rate of at least 20 KHz.

9. The device according to claim 1, wherein:
  the measuring optical fiber includes a component located at or near an end thereof, the component reducing a reflectance by at least 20 dB.

* * * * *